(12) United States Patent
Narumi et al.

(10) Patent No.: US 6,914,866 B2
(45) Date of Patent: Jul. 5, 2005

(54) OPTICAL INFORMATION RECORDING MEDIUM AND INFORMATION RECORDING METHOD AND APPARATUS USING THE RECORDING MEDIUM

(75) Inventors: Shinya Narumi, Yokohama (JP); Katsuyuki Yamada, Zama (JP); Kazunori Ito, Yokohama (JP); Hajime Yuzurihara, Odawara (JP); Nobuaki Onagi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 263 days.

(21) Appl. No.: 10/116,582

(22) Filed: Apr. 4, 2002

(65) Prior Publication Data

US 2002/0145963 A1 Oct. 10, 2002

(30) Foreign Application Priority Data

Apr. 6, 2001 (JP) ......................................... 2001-108341

(51) Int. Cl.[7] ............................... G11B 7/00; G11B 7/24
(52) U.S. Cl. .................. 369/59.11; 369/116; 369/275.2
(58) Field of Search .......................... 369/59.11, 59.12, 369/116, 59.26, 47.5, 47.51, 47.52, 47.53, 275.2, 283, 288, 284

(56) References Cited

U.S. PATENT DOCUMENTS

| 5,646,924 A | 7/1997 | Nonoyama et al. ........... 369/58 |
| 5,848,045 A | 12/1998 | Kirino et al. |
| 6,177,166 B1 * | 1/2001 | Ohno et al. ................. 369/283 |
| 6,280,810 B1 | 8/2001 | Nakamura et al. ......... 428/64.1 |
| 6,631,109 B2 * | 10/2003 | Nakamura ................ 369/59.11 |

FOREIGN PATENT DOCUMENTS

| EP | 0737962 A | 10/1996 |
| EP | 0977184 A | 2/2000 |
| EP | 1058240 A | 12/2000 |
| EP | 1117094 A | 7/2001 |
| EP | 1045378 A | 9/2001 |
| EP | 1130583 A | 9/2001 |

OTHER PUBLICATIONS

U.S. Appl. No. 09/928,882, filed Aug. 13, 2001.
U.S. Appl. No. 09/902,699, filed Jul. 12, 2001.
U.S. Appl. No. 09/779,000, filed Feb. 7, 2001.
U.S. Appl. No. 09/793,131, filed Feb. 27, 2001.
U.S. Appl. No. 09/270,108, filed Mar. 16, 1999.

* cited by examiner

*Primary Examiner*—Thang V. Tran
(74) *Attorney, Agent, or Firm*—Cooper & Dunham LLP

(57) ABSTRACT

An optical information recording method including: irradiating a recording medium with laser light, wherein 0 signals having width nT are recorded or rewritten using continuous laser light having a power level Pe, and 1 signals having width nT are recorded or rewritten using a light pulse train having a first pulse portion fp having power Pw and width xT (T: clock time), a multi-pulse portion mp in which a number (n−n') of high level pulses each having power Pw' and width yT, and, if (n−n')>1, a low level pulse which has power Pb and width (1−y)T are applied, and an end pulse portion ep having power Pb' and width zT, wherein n and n' are a positive integer (n>n'), and wherein each of Pw and Pw' is greater than Pe, Pe is greater than each of Pb and Pb', and at least one of x, y and z is in a range as follows: $0.35 \leq x \leq 0.75$, $0.30 \leq y \leq 0.55$, $0.35 \leq z \leq 0.70$.

12 Claims, 3 Drawing Sheets ep

OPTICAL INFORMATION RECORDING MEDIUM AND INFORMATION RECORDING METHOD AND APPARATUS USING THE RECORDING MEDIUM

BACKGROUND OF THE INVENTION

1. Field of the Invention

The present invention relates to an optical information recording medium, and more particularly to a phase-change optical information recording medium in which information is recorded, reproduced and rewritten by changing an optical property of a material in the recording layer thereof by irradiating the recording layer with a laser light beam. In addition, the present invention also relates to an information recording method and apparatus using the optical information recording medium.

2. Discussion of the Related Art

Various optical information recording media capable of recording and reproducing information upon irradiation of laser light thereto have been developed and used. Specific examples of such optical information recording media include CD-Rs and DVD-Rs, in which information can be written once, and CD-RWs, DVD-RWs, DVD-RAMs, MDs and MO disks, in which information can be rewritten. These optical information media are removable and therefore the demand therefor has been increasing year by year.

Among these optical information recording media, CD-RWs, DVD-RWs, DVD-RAMs, etc. use phase-change materials in their recording layers, i.e., utilize changes between a crystal phase and non-crystal phase or between crystal phases. Particularly, magneto-optical memories such as MDs and MO disks have advantages such that overwriting can be performed using a single light beam, and in addition the optical systems of the record/reproduction devices which record and reproduce information in the magneto-optical memories are simple. Therefore the demand for these optical information recording media has been increasing.

In general, when information is recorded in a phase-change information recording medium, a pulse strategy in which the power level of the laser light used for recording and rewriting is changed so as to be three levels is used. When multi-speed recording and CAV (constant angular velocity) recording in which information is recorded in a recording medium at different linear speeds are performed using this pulse strategy, the energy needed for heating the recording layer of the recording medium to a predetermined temperature in high linear speed recording is greater than that in low linear speed recording, and therefore recording conditions in high linear speed recording have to be different from those in low linear speed recording. Accordingly, needs exist for techniques in which the recording power is increased in high linear speed recording, and/or the running time for a high level pulse having a power level Pw in a mp portion is lengthened in the high linear speed recording, to properly record information in a recording medium even when recording speed is changed, i.e., to record information having good recording properties in a recording medium.

In this case, the suitable recording conditions change depending on the materials used for the recording medium and construction of the recording medium. Therefore a technique is used for CD-RWs in which suitable recording conditions at each of the linear recording speeds, 1× (i.e., 1.2 m/s), 4× (4.8 m/s) and 10× (12 m/s) are input therein such that the recording devices can properly set the recording conditions using this information.

However, when such a technique is used, at first the suitable recording power and/or suitable record pulse strategy are determined for each linear recording speed and then suitable recording conditions have to be set for each linear recoding speed. Therefore, in CAV recording in which linear recording speed is continuously changed as the recording point moves in a diameter direction of a recording medium, the setting of suitable recording conditions is very difficult. Therefore, a need exits for a recording method in which information in good condition can be recorded even in such a case. Alternatively, a need exists for an optical information recording medium in which information in good condition can be recorded independently of the linear recording speed.

SUMMARY OF THE INVENTION

Accordingly, an object of the present invention is to provide an optical information recording medium in which information having good signal properties can be recorded even when used for recording methods such as multi-speed recording and CAV recording in which information is recorded at different linear recording speeds.

Another object of the present invention is to provide an information recording method and apparatus in which information having good signal properties can be recorded in an optical recording medium even when changing the recording speeds.

To achieve such an object, the present invention contemplates the provision of an optical information recording method including the steps of:

providing a phase-change optical recording medium which at least has a transparent substrate having at least one of concentric grooves and a spiral groove and a phase-change recording layer located overlying the transparent substrate; and irradiating the recording layer with a laser light beam to record or rewrite information in the phase-change optical recording medium by mark edge recording;

wherein a 0 signal having a signal width nT (T is a clock time) is recorded or rewritten using continuous laser light having a power level Pe, and a 1 signal having a signal width nT is recorded or rewritten using a pulse train which has a first pulse portion fp having a power level Pw and a pulse width xT, a multi pulse portion mp in which a number (n−n') of high level pulses each having a power level Pw' and a pulse width yT, and, if (n−n')>1, a low level pulse which is located between two of the high level pulses and has a power level Pb and a pulse width (1−y)T are applied, and an end pulse portion ep having a power level Pb' and a pulse width zT, wherein each of n and n' is independently a positive integer and n is not less than n', and wherein each of Pw and Pw' is greater than Pe, Pe is greater than each of Pb and Pb', and at least one of x, y and z is in a range as follows:

$$0.35 \leq x \leq 0.75,\ 0.30 \leq y \leq 0.55,\ 0.35 \leq z \leq 0.70.$$

It is preferable that the irradiating step is performed while the optical information recording medium rotates at a linear speed of from V m/s to 3V m/s, wherein V is from 3 to 13.

The at least one of concentric grooves and a spiral groove is wobbled in a radium direction of the optical information recording medium at a period of from 4.0 $\mu$m to 4.6 $\mu$m.

It is preferable that the at least one of x, y and z is fixed at a fixed value in the above-mentioned range using information stored in the optical information recording medium.

In addition, the power levels Pw, Pw', Pe, Pb, and Pb' are preferably controlled such that the recorded signals have a jitter $\sigma/T$ not greater than 9%, a modulation degree not less than 0.55 and a reflectance not less than 16% when the recorded signals are reproduced.

In another aspect of the present invention, an optical information recording apparatus is provided which includes a disk drive configured to rotate an optical information recording medium, a laser driving circuit configured to emit a laser light pulse, and a pickup configured to irradiate the recording medium with the laser light pulse using mark edge recording to record or rewrite information in the recording medium, wherein the laser driving circuit emits the laser light pulse by the optical information recording method mentioned above.

Preferably the pickup irradiates the optical information recording medium while the disk drive rotates the optical information recording medium at a linear speed of from V to 3V m/s, wherein V is from 3 to 13. The optical information recording medium preferably has at least one of concentric grooves and a spiral groove, which are wobbled in a radius direction of the optical information recording medium at a period of from 4.0 µm to 4.6 µm, wherein the pickup irradiates the optical information recording medium with the laser light along the at least one of concentric grooves and a spiral grooves.

In addition, it is preferable that the pickup reads information stored in the optical information recording medium to fix the at least one of x, y and z at a fixed value in the above-mentioned range.

Further, the power levels Pw, Pw', Pe, Pb, and Pb' are preferably controlled such that the recorded signals have a jitter σ/T not greater than 9%, a modulation degree not less than 0.55 and a reflectance not less than 16% when the recorded signals are reproduced.

In yet another aspect of the present invention, a phase-change optical information recording medium is provided which is for use in the optical information recording method and/or apparatus, wherein the optical information recording medium includes a transparent substrate having at least one of concentric grooves and a spiral groove, a lower protective layer located overlying the transparent substrate, a phase-change recording layer located overlying the lower protective layer, an upper protective layer located overlying the recording layer, a reflection layer located overlying the upper protective layer and an overcoat layer located overlying the reflection layer, and wherein a 0 signal and a 1 signal are recorded or rewritten along the at least one of concentric grooves and a spiral groove by the above-mentioned optical information recording method.

It is preferable that the recording medium stores information, wherein the 1 signal is recorded or rewritten while the at least one of x, y and z is at a fixed value in the range thereof using the information to easily set the recording conditions, resulting in high-speed and high-precision recording.

In addition, it is preferable that the at least one of concentric grooves and a spiral groove is wobbled in a radius direction of the recording medium at a period of from 4.0 µm to 4.6 µm to impart good reproduction compatibility to the recording medium.

Further, it is preferable that the recorded signals have a jitter σ/T not greater than 9%, a modulation degree not less than 0.55 and a reflectance not less than 16% when the recorded signals are reproduced, by controlling the power levels Pw, Pw', Pe, Pb, and Pb'.

Preferably, the recording layer includes at least one element of Ag and Ge, at least one element of In and Ga, Sb and Te such that contents of a total of Ag and Ge, a total of In and Ga, Sb and Te are α, β, γ and δ atomic %, respectively, wherein α+β+γ+δ=100, and wherein 0<α≦6, 2≦β≦8, 60≦γ≦72 and 22≦δ≦27.

The optical information recording medium may further include a second single plate disk overlying the overcoat layer, wherein the second single plate disk includes a structure similar to the first-mentioned single plate disk.

The phase-change recording layer, lower protective layer, upper protective layer and reflection layer preferably have a thickness of from 10 nm to 50 nm, from 60 nm to 120 nm, from 5 nm to 45 nm and from 50 nm to 200 nm, respectively.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

At first, the method of recording and reproducing information in the phase-change optical information recording medium of the present invention will be explained in detail.

Figure 1:
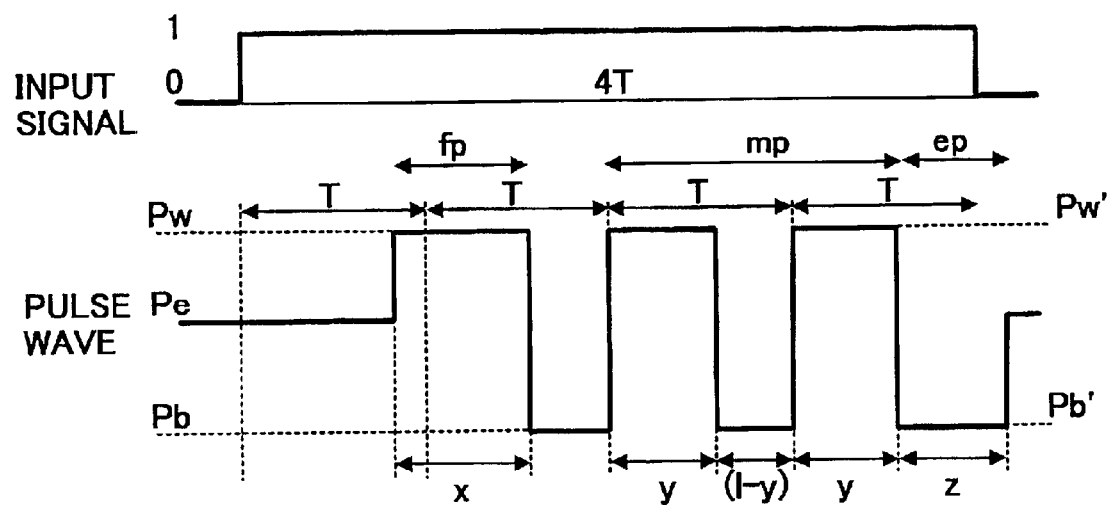
FIG. 1 is a schematic view for explaining how laser light is irradiated to the phase-change optical information recording medium of the present invention to record and rewrite information therein.
Figure 2:
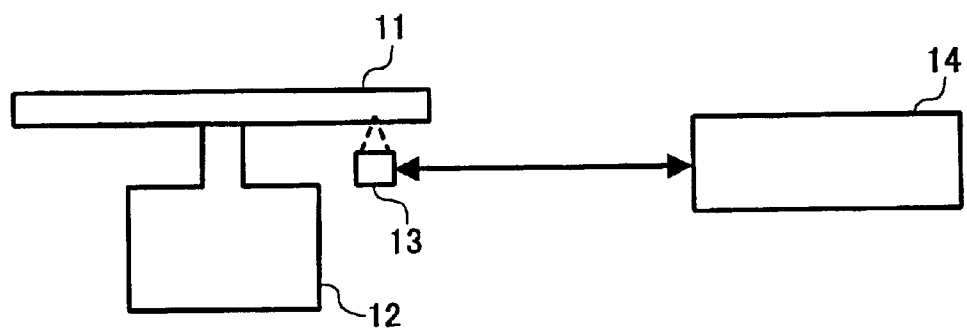
FIG. 2 is a schematic view illustrating a main portion of an embodiment of the optical information recording apparatus of the present invention.

FIG. 2 is a schematic view illustrating a main portion of an embodiment of the optical information recording apparatus of the present invention. As shown in FIG. 2, an optical information recording medium 11 (hereinafter referred to as a recording medium) is rotated by a disk drive 12 including a spindle motor. A laser diode is driven by a laser driving circuit 14 to emit laser light. The emitted laser light is irradiated by record/reproduction pickup 13 through an optical system. The laser driving circuit 14 controls the laser light such that the laser light is emitted according to the pulse strategy having fp, mp and ep portions as illustrated in FIG. 1. To irradiate the recording layer of the recording medium with laser light causes a phase change in the recording layer. Thus information is recorded therein. The information can be reproduced by irradiating the recording medium with laser light and receiving the reflected light by the pickup.

In the present invention, information recording is performed by so-called PWM recording (i.e., mark-edge recording) in which signals are recorded in the recording layer by changing the width of record marks. The signals to be recorded are recorded by a clock in a modulation section using a method such as EFM methods (Eight-to-Fourteen Modulation) which are suitable for CD-RWs and modified EFM methods.

In the PWM recording, a 0 signal having a signal width of nT after being modulated is recorded and rewritten using continuous light having a power level of Pe, wherein n represents a predetermined value and T represents a clock time which is the period of a clock used for modulating the signal). A 1 signal having signal width of nT after being modulated is recorded and rewritten using a pulse train which has a first pulse portion fp having a power level Pw and a pulse width xT, a multi-pulse portion mp in which a number (n−n') of high level pulses each having a power level Pw' and a pulse width yT, and, if (n−n')>1, a low level pulse which is located between two of the high level pulses and has a power level Pb and a pulse width (1−y)T are applied (n−n') times, and an end pulse portion ep having a power level Pb' and a pulse width zT, wherein each of n and n' is independently a positive integer and n is greater than n', and each of the power levels Pw and Pw' is greater than Pe and Pe is greater than each of Pb and Pb'.

In the embodiment as shown in FIG. 1, n is 4 and n' is 2.

Figure 3:
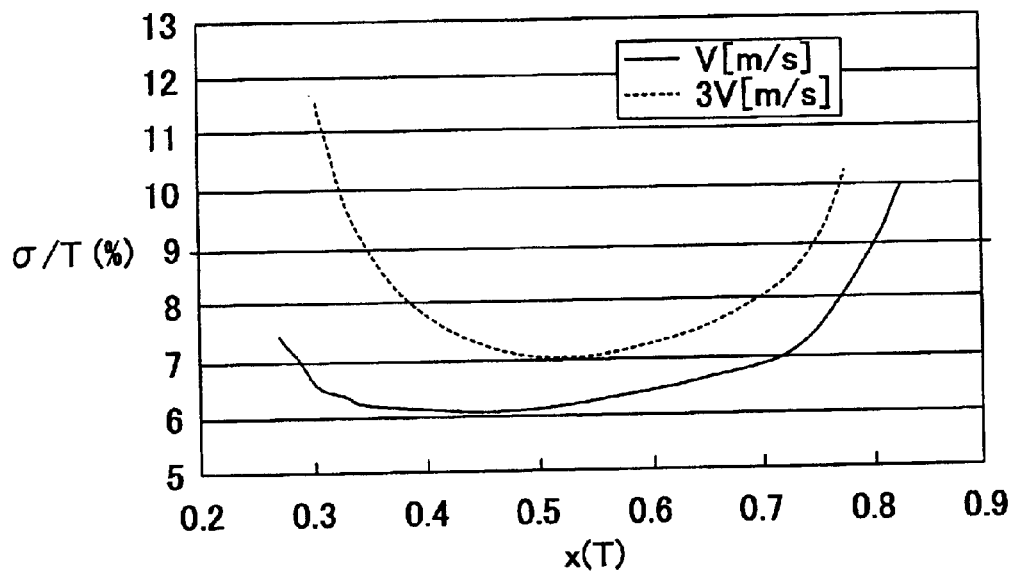
FIG. 3 is a graph illustrating the relationship between a pulse width of the first pulse portion fp and a jitter σ/T of reproduced signals.
Figure 4:
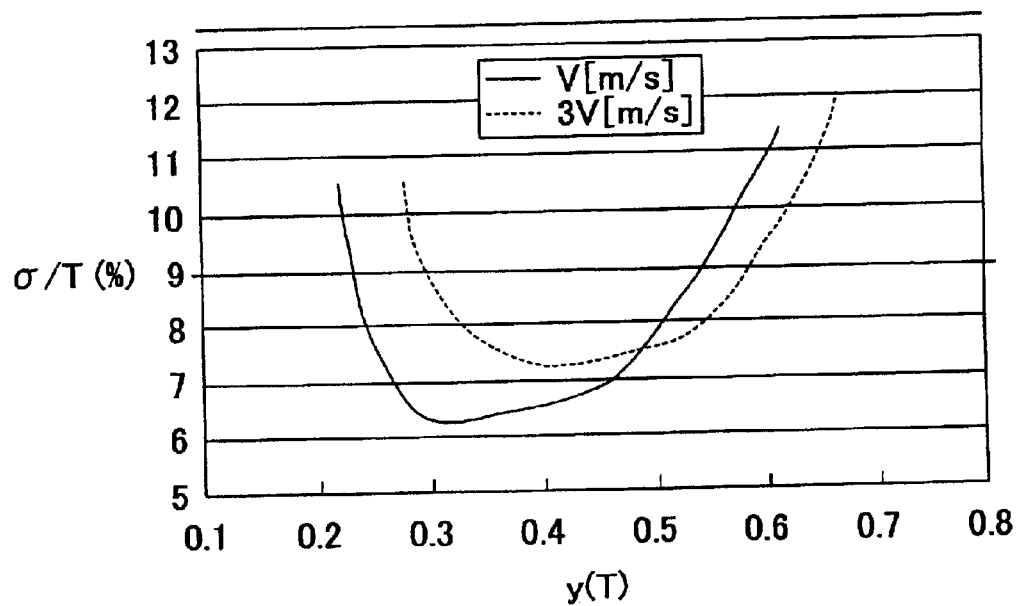
FIG. 4 is a graph illustrating the relationship between a pulse width of the multi-pulse portion mp and a jitter σ/T of reproduced signals.
Figure 5:
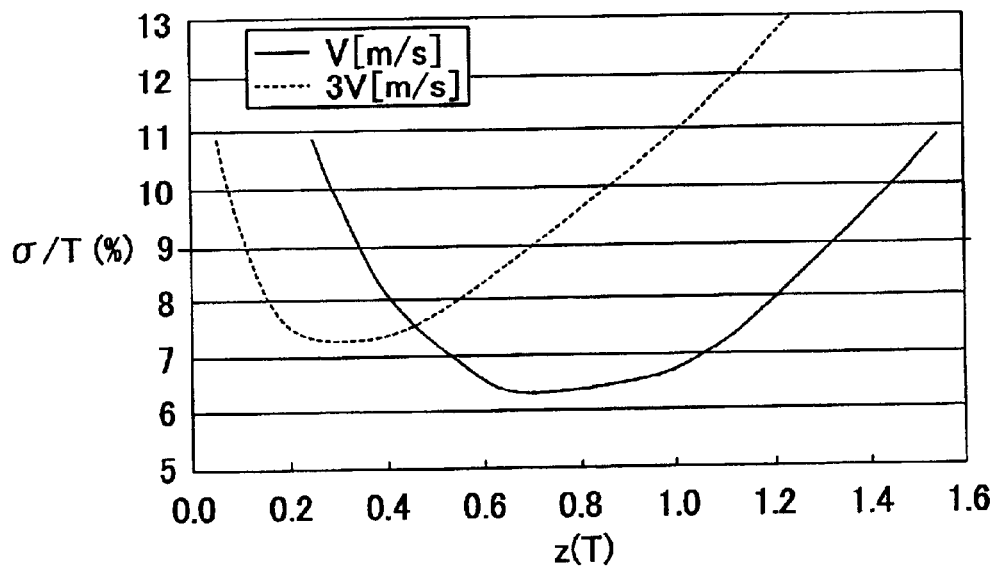
FIG. 5 is a graph illustrating the relationship between a pulse width of the end pulse portion ep and a jitter property σ/T of reproduced signals.

When information is recorded in the recording medium of the present invention at a linear recording speed of V m/s using this recording method, the jitter σ/T of the reproduced signals of the recorded information id not greater than 9% (namely, good reproduction compatibility can be secured) if the following relationships are satisfied:

0.25<x≦0.8 (as can be understood from FIG. 3), 0.25≦y≦0.55 (as can be understood from FIG. 4), and 0.35≦z≦1.3 (as can be understood from FIG. 5).

When information is recorded in the recording medium of the present invention at a linear recording speed of 3V m/s using this recording method, the jitter property σ/T of the reproduced signals of the recorded information is not greater than 9% if the following relationships are satisfied:

0.35≦x≦0.75 (as can be understood from FIG. 3), 0.30≦y≦0.60 (as can be understood from FIG. 4), and 0.10≦z≦0.7 (as can be understood from FIG. 5).

When these conditions are satisfied, the modulation degree of the reproduced signals is not less than 0.55 and the reflectance thereof is not less than 16%. Namely, an optical information recording medium in which the recorded information can be securely reproduced by reproduction-only devices.

Therefore, when information is recorded at any one of the linear speeds of V m/s and 3V/m, the reproduced signals have a jitter not greater than 9%, a modulation degree not less than 0.55 and a reflectance not less than 16% if the following relationships are satisfied:

0.35≦x≦0.75 (as can be understood from FIG. 3), 0.30≦y≦0.55 (as can be understood from FIG. 4), and 0.35≦z≦0.70 (as can be understood from FIG. 5).

Namely, even when information is recorded in the recording medium at any linear speed of from V to 3V m/s, the recording medium has good reproduction compatibility (i.e., the recorded information can be well reproduced by reproduction-only devices) if the above-mentioned relationships are satisfied.

Then the recording medium of the present invention will be explained.

Figure 6:
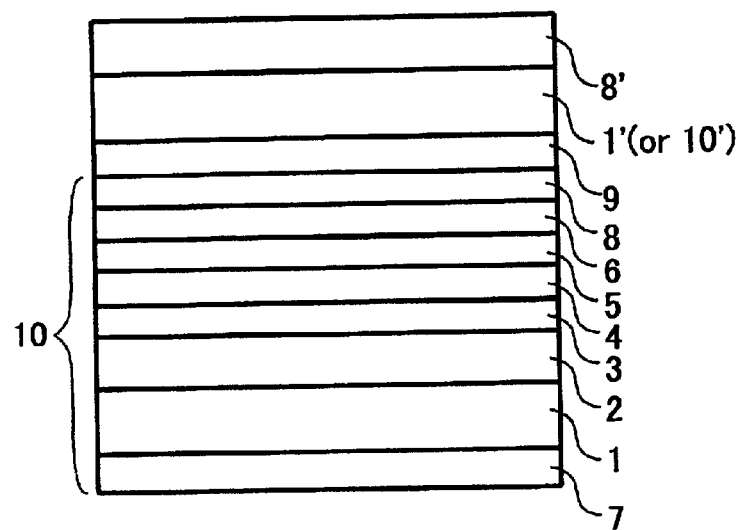
FIG. 6 is a schematic view illustrating the cross section of an embodiment of the optical information recording medium of the present invention.

FIG. 6 is a schematic view illustrating the cross section of an embodiment of the optical information recording medium of the present invention.

The recording medium has a transparent substrate 1, which has a spiral guide groove periodically wobbled in a radius direction of the recording medium, and a lower protective layer 2, a recording layer 3, an upper protective layer 4, a reflection layer 5 and an overcoat layer 6 which are overlaid on one side of the transparent substrate 1 one by one in this order. A print layer 8 may be formed on the overcoat layer 6, and a hard coat layer 7 may be formed on the other side of the transparent substrate 1. At this point, the combination of the substrate 1, lower protective layer 2, recording layer 3, upper protective layer 4, reflection layer 5 and an overcoat layer 6, and optionally the print layer 8 and hard coat layer 7 is referred to as a single plate disk 10.

In addition, a second transparent substrate 1' may be formed on the print layer 8 with an adhesive layer 9 therebetween. The transparent substrate 1' can be replaced with a second single plate disk 10'. In this case, the single plate disk 10 having no print layer 8 can be formed on the overcoat layer 6 or the print layer 8 with the adhesive layer 9 therebetween and then a second print layer 8' may be formed thereon.

Specific examples of the materials for use as the transparent substrates 1 and 1' include glass, ceramics, and resins. Among these materials, resins are preferable in view of moldability and manufacturing costs. Specific examples of the resins for use as the transparent substrates 1 and 1' include polycarbonate resins, acrylic resins, epoxy resins, polystyrene resins, acrylonitrile-styrene copolymers, polyethylene resins, polypropylene resins, silicone resins, fluorine-containing resins, ABS resins, urethane resins, etc. Among these resins, polycarbonate resins and acrylic resins are preferably used because of having good moldability, good optical properties and low costs.

Suitable phase-change materials for use in the recording layer include materials including Sb and Te which can change their phase from a crystal phase to an amorphous phase or vice versa, i.e., wherein the crystal phase and amorphous phase are in a stable state or a semi-stable state. This is because these materials have good recording sensitivity (i.e., the phase can be changed at a high speed from a crystal phase to an amorphous state), good erasing sensitivity (i.e., the phase can be changed at a high speed from an amorphous phase to a crystal state) and good erasure ratio.

By including one or more of elements such as Ga, Ge, Ag, In, Bi, C, N, O, Si and S into the SbTe recording materials, the recording sensitivity, erasing sensitivity, signal properties and reliability of the recording materials can be improved. Specifically, it is preferable to include one or more of the above-mentioned elements in a SbTe material and adjust the formula of the recording material, such that information can be recorded in the resultant recording material in a desired recording speed range and the recorded signals can be stably reproduced and have a long life (i.e., good reliability).

In order that information is recorded in the recording medium of the present invention at a linear recording speed of from 3 to 9 m/s, recording materials including at least one of Ag and Ge, at least one of In and Ga, Sb and Te are preferably used. In addition, the contents of the elements are preferably as follows:

(Ag/Ge):(In/Ga):Sb:Te=α:β:γ:δ wherein the total of α, β, γ and δ is 100 (atomic %), and wherein α, β, γ and δ have the following relationship:

0<α≦6, 2≦β≦8, 60≦γ≦72 and 22≦δ≦27.

The recording materials having such a formula have advantages such that the recorded signals can be stably reproduced and have a long life.

When the formula of the recording material is out of the above-mentioned range, the jitter of reproduction signals tends to exceed 9% when information is overwritten (i.e., the reproduction stability deteriorates) and in addition the reliability of the recorded signals deteriorates when preserved for a long period of time.

The thickness of the recording layer is preferably from 10 to 50 nm, more preferably from 12 to 30 nm, and even more preferably from 14 to 25 nm, in view of initial jitter property, overwriting properties and productivity. When the recording layer is too thin, light absorption ability of the recording layer seriously deteriorates and therefore the recording layer does not function. In contrast, when the recording layer is too thick, a uniform phase change cannot be performed at a high speed.

The recording layer can be formed by a method such as vapor-phase growth methods (e.g., vacuum vapor deposition methods, sputtering methods, plasma CVD methods, light CVD methods, ion plating methods, electron beam deposition methods, etc.) Among these methods, sputtering methods are preferable because the sputtering methods have good productivity and can produce a recording layer having good film properties.

The recording layer is sandwiched by the lower and upper protective layers. Suitable materials for use in the lower and upper protective layers include metal oxides such as SiO, $SiO_2$, ZnO, $SnO_2$, $Al_2O_3$, $TiO_2$, $In_2O_3$, MgO and $ZrO_2$, nitrides such as $Si_3N_4$, AlN, TiN, BN and ZrN, sulfides such as ZnS, $In_2S_3$ and $TaS_4$, carbides such as SiC, TaC, BC, WC, TiC and ZrC, and diamond-like carbon. These materials can be used alone or in combination. In addition, impurities may be contained in the materials. Further, each of the lower and upper protective layers may be a single layer or a multi-layer in which two or more layers are overlaid. The lower and upper protective layers preferably have a melting point higher than the melting point of the recording layer.

The lower and upper protective layers can be formed by one of the methods mentioned above for use in the recording layer.

The thickness of the lower protective layer influences on the reflectance, modulation and recording sensitivity of the resultant recording medium. In order to prepare a recording medium having good signal properties, the thickness of the lower protective layer is preferably from 60 nm to 120 nm.

The thickness of the upper protective layer is preferably from 5 nm to 45 nm and more preferably from 7 nm to 40 nm. When the upper protective layer is too thin, the layer does not function as a heat resistant layer, and in addition the recording sensitivity deteriorates. In contrast, when the upper protective layer is too thick, the layer tends to peel from the recording layer and/or the reflection layer and in addition repeat recording properties also deteriorate.

Suitable materials for use in the reflection layer include metals such as Al, Au, Ag, Cu, Ta, Ti and W and metal alloys of the metals. In order to improve the corrosion resistance and electroconductivity of the reflection layer, one or more elements such as Cr, Ti, Si, Cu, Ag, Pd and Ta are preferably added to the reflection layer in an amount of from 0.3 to 2 atomic %. When the addition amount of the elements is too small, the effect of imparting corrosion resistance to the layer is hardly produced. In contrast, the addition amount is too large, the heat conductivity seriously increases and in addition it is hard for the recording layer to achieve an amorphous state.

The reflection layer can be formed by any one of the vapor-phase growth methods mentioned above for use in the recording layer.

The thickness of the reflection layer is from 50 nm to 200 nm, and preferably from 70 nm to 160 nm. The reflection layer may be a multi-layer. In this case, each of the multi layers preferably has a thickness not less than 10 nm, and total thickness of the multi-layer reflection layer is preferably from 50 nm to 160 nm.

The overcoat layer is formed on the reflection layer to prevent the reflection layer from being oxidized. Ultraviolet crosslinking resins are typically used for the overcoat layer. The overcoat layer is typically formed by a spin coating method. The thickness of the reflection layer is preferably from 3 $\mu$m to 15 $\mu$m. When the overcoat layer is too thin, the error rate in reading signals tends to increase if the print layer is formed on the overcoat layer. When the overcoat layer is too thick, the internal stress of the layer seriously increases, and thereby the mechanical properties of the disk are deteriorated.

The hard coat layer is typically formed by coating an ultraviolet crosslinking resin by a spin coating method. The thickness of the hard coat layer is preferably from 2 $\mu$m to 6 $\mu$m. When the hard coat layer is too thin, good abrasion resistance cannot be imparted to the recording media (i.e., the transparent substrate). In contrast, when the hard coat layer is too thick, the internal stress of the layer seriously increases, and thereby the mechanical properties of the disk are deteriorated. It is preferable that the hard coat layer is not hurt when the surface of rubbed with a cloth, i.e., the hard coat layer preferably has a pencil hardness of H or harder when the hardness is evaluated by a method based on JIS K5400. In addition, it is also preferable to add an electroconductive material in the hard coat layer to prevent the hard coat layer from charging, i.e., to prevent adhesion of dust to the layer.

The print layer is formed to improve the abrasion resistance of the recording medium, and to print characters and images such as trade names. In addition, a receiving layer on which characters and/or images are formed by an inkjet recording method or the like method may be formed as the print layer. The print layer is typically formed by coating an ultraviolet crosslinking resin using a screen printing method.

The thickness of the print layer is preferably from 3 $\mu$m to 50 $\mu$m. When the print layer is too thin, the print layer is unevenly formed. When the print layer is too thick, the internal stress of the recording medium seriously increases, and thereby the mechanical properties of the recording medium are deteriorated.

Suitable materials for use in the adhesive layer include ultraviolet crosslinking adhesives, hot melt adhesives, silicone adhesives, etc. The adhesive layer is typically formed on the overcoat layer or print layer by coating such an adhesive by a method such as spin coating, roll coating and screen coating methods. Then a transparent substrate or a single plate disk is adhered thereon while the adhesive layer (i.e., the combination disk) is subjected to an ultraviolet irradiation treatment, heating treatment and/or pressing treatment.

The adhesive layer 9 may be coated on the second transparent substrate 1' (or the second single plate disk 10') and/or the print layer 8 (or the overcoat layer 6) of the single plate disk 10.

In addition, an adhesive sheet can be used as the adhesive layer 9.

The thickness of the adhesive layer is not particularly limited, but is preferably from 5 $\mu$m to 100 $\mu$m in view of coating quality and crosslinking property of the adhesive layer and mechanical properties of the disk.

The area of a portion on which an adhesive is applied is not particularly limited. However, when the adhesive layer is applied to DVD and/or CD compatible optical information recording media, the distance between the inside end of the portion and the center of the recording media is preferably from 15 mm to 40 mm, and more preferably from 15 mm to 30 mm.

Having generally described this invention, further understanding can be obtained by reference to certain specific examples which are provided herein for the purpose of illustration only and are not intended to be limiting.

EXAMPLES

Example 1

A polycarbonate substrate was formed by an injection molding method. The polycarbonate substrate had a spiral groove having a track pitch of 0.74 $\mu$m, a depth of 25 nm, a width of 250 nm and a wobble period of 4.3 $\mu$m. On the polycarbonate substrate, a lower protective layer of ZnS-$SiO_2$ having a thickness of 80 nm, a $Ag_4Ge_1In_8Sb_{60}Te_{27}$ recording layer having a thickness of 15 nm, an upper protective layer in which a layer of $ZnS.SiO_2$ having a thickness of 15 nm and a layer of SiC having a thickness of 5 nm were overlaid, and a reflection layer of Ag having a thickness of 140 nm were formed in this order by sputtering.

In addition, an overcoat layer was formed on the reflection layer by coating an ultraviolet crosslinking resin by a spin coating method. Thus a phase-change single plate disk, which has a DVD-ROM reproduction compatibility, was formed. Another polycarbonate substrate (i.e., a second polycarbonate substrate) was adhered on the overcoat layer of the thus prepared single plate disk with an adhesive layer therebetween. A print layer was formed on the surface (i.e., the surface opposite to the adhesive layer) of the second polycarbonate substrate.

Thus a laminated disk was prepared.

Then the entire recording layer was crystallized using an initializer including a LD having a large beam diameter (200×1 $\mu$m).

Then information was recorded using signals having a width of from 3T to 14T (T: clock time) and an eight-to-sixteen modulation method (i.e. information was recorded according to DVD-ROM standards). Other recording conditions are as follows:

Pw=Pw'=13.5 mW,

Pe=7.2 mW,

Pb=Pb'=0.1 mW,

X=0.50, y=0.45, z=0.50 and

Linear recording speed: 3 m/s.

The reproduced signals had a jitter of 8.7%, a modulation degree of 0.672 and a reflectance of 20.2%.

Then recording was performed at a recording speed of 6 m/s. The reproduced signals had a jitter of 8.5%, a modulation degree of 0.660 and a reflectance of 19.6%.

Further, recording was performed at a recording speed of 9 m/s. The reproduced signals had a jitter of 8.1%, a modulation degree of 0.656 and a reflectance of 19.5%. The above-mentioned properties were measured using DDU-1000 manufactured by Pulstec Industrial, Co., Ltd.

In addition, when the information recorded in the optical recording medium was reproduced by a DVD-ROM drive, the information can be reproduced without any problem.

Effects of the Present Invention

In the information recording method of the present invention, information is recorded or rewritten in an optical information recording medium by PWM recording in which at least one of the widths of fp, mp and ep of recording pulses is specified, and therefore signals having good characteristics can be recorded even when multi-speed recording or CAV recording is performed, i.e., even when recording is performed at different speeds. Therefore reproduction compatibility can be improved, i.e., the recorded information can be well reproduced by reproduction-only apparatus such as DVD-ROM drives.

By fixing at least one of pulse widths (namely, x, y and z), setting of the pulse strategy can be simplified even when recording is performed at different recording speed.

By controlling the pulse power levels (namely, Pw, Pw', Pb, Pb' and PC), signals having good reproducing characteristics can be recorded and therefore reproduction compatibility can be improved.

In addition, the optical information recording apparatus of the present invention records information in a phase-change information recording medium using the information recording method mentioned above and therefore the recording apparatus has good reproduction compatibility.

Further, the optical information recording medium of the present invention has good signal reproduction property and good preservation reliability, and therefore recorded information can be well reproduced by reproduction-only devices (i.e., the recording medium has good reproduction compatibility with reproduction-only devices) even when the recorded information is preserved for a long period of time.

Additional modifications and variations of the present invention are possible in light of the above teachings. It is therefore to be understood that within the scope of the appended claims the invention maybe practiced other than as specifically described herein.

This document claims priority and contains subject matter related to Japanese Patent Application No. 2001-108341, filed on Apr. 6, 2001, the entire contents of which are herein incorporated by reference.

What is claimed is:

1. An optical information recording method comprising:

irradiating a phase-change recording layer of an optical information recording medium with a laser light beam to record or rewrite information in the phase-change recording layer by mark edge recording, wherein the optical information recording medium includes a transparent substrate having at least one of concentric grooves and a spiral groove, and the phase-change recording layer is located overlying the transparent substrate, and wherein irradiation is performed along the at least one of concentric grooves and a spiral groove, wherein a 0 signal having a signal width nT is recorded or rewritten using continuous laser light having a power level Pe, and a 1 signal having a signal width nT is recorded or rewritten using a light pulse train which has a first pulse portion fp having a power level Pw and a pulse width xT, a multi-pulse portion mp in which a number (n−n') of high level pulses each having a power level of Pw' and a pulse width yT, and, if (n−n')>1, a low level pulse which is located between two of the high level pulses and has a power level Pb and a pulse width (1−y)T are applied, and an end pulse portion ep having a power level Pb' and a pulse width zT, wherein T is a clock time, each of n and n' is independently a positive integer and n is greater than n', and wherein each of Pw and Pw' is greater than Pe, Pe is greater than each of Pb and Pb', and at least one of x, y and z is in a range as follows:

$0.35 \leq x \leq 0.75, 0.30 \leq y \leq 0.55, 0.35 \leq z \leq 0.70$, and wherein the irradiating step is performed while the optical information recording medium rotates at a linear speed of from V m/s to 3V m/s, and wherein V is from 3 to 13.

2. The optical information recording method according to claim 1, wherein the at least one of concentric grooves and a spiral groove is wobbled in a radius direction of the optical information recording medium at a period of from 4.0 $\mu$m to 4.6 $\mu$m.

3. The optical information recording method according to claim 1, further comprising reading information stored in the optical information recording medium to fix the at least one of x, y and z at a fixed value in the range thereof.

4. The optical information recording method according to claim 1, wherein the 0 signal and 1 signal are recorded or rewritten while the power levels Pw, Pw', Pe, Pb and Pb' are controlled such that the recorded or rewritten signals have a jitter σ/T not greater than 9%, a modulation degree not less than 0.55 and a reflectance not less than 16% when the recorded or rewritten signals are reproduced.

5. An optical information recording apparatus comprising:

a disk drive configured to rotate an optical information recording medium, wherein the optical information recording medium includes a transparent substrate having at least one of concentric grooves and a spiral groove and a phase-change recording layer is located overlying the transparent substrate;

a laser driving circuit configured to emit laser light pulse; and a pickup configured to irradiate the optical information recording medium with the laser light pulse emitted by the laser driving circuit using mark edge recording to record or rewrite information in the phase-change recording layer along the at least one of concentric grooves and a spiral groove, wherein a 0 signal having a signal width nT is recorded or rewritten using continuous laser light having a power level Pe, and a 1 signal having a signal width nT is recorded or rewritten using a light pulse train which has a first pulse portion fp having a power level Pw and a pulse width xT, a multi-pulse portion mp in which a number (n−n') of high level pulses each having a power level of Pw' and a pulse width yT, and, if (n−n')>1, a low level pulse which is located between two of the high level pulses and has a power level Pb and a pulse width (1−y)T are applied, and an end pulse portion ep having a power level Pb' and a pulse width zT, wherein T is a clock time, each of n and n' is independently a positive integer and n is greater than n', and wherein each of Pw and Pw' is greater than Pe, Pe is greater than each of Pb and Pb', and at least one of x, y and z is in a range as follows:

$0.35 \leq x \leq 0.75, 0.30 \leq y \leq 0.55, 0.35 \leq z \leq 0.70$, and wherein the pickup irradiates the optical information recording medium while the disk drive rotates the optical information recording medium at a linear speed of from V m/s to 3V m/s, and wherein V is from 3 to 13.

6. The optical information recording apparatus according to claim 5, wherein the at least one of concentric grooves and a spiral groove is wobbled in a radius direction of the optical information recording medium at a period of from 4.0 μm to 4.6 μm.

7. The optical information recording apparatus according to claim 5, wherein the 1 signal is recorded or rewritten while the at least one of x, y and z is at a fixed value in the range thereof.

8. The optical information recording apparatus according to claim 5, wherein the 0 signal and 1 signal are recorded or rewritten while the power levels Pw, Pw', Pe, Pb and Pb' are controlled such that the recorded or rewritten signals have a jitter σ/T not greater than 9%, a modulation degree not less than 0.55 and a reflectance not less than 16% when the recorded or rewritten signals are reproduced.

9. An optical information recording medium comprising:
a single plate disk comprising:
a transparent substrate having at least one of concentric grooves and a spiral groove,
a lower protective layer located overlying the transparent substrate,
a phase-change recording layer located overlying the lower protective layer,
an upper protective layer located overlying the recording layer,
a reflection layer located overlying the upper protective layer and;
an overcoat layer located overlying the reflection layer, wherein a 0 signal having a signal width nT and 1 signal having a signal width nT are recorded or rewritten in the phase-change recording layer along the at least one of concentric grooves and a spiral groove, wherein the 0 signal is recorded or rewritten using continuous laser light having a power level Pe, and the 1 signal is recorded or rewritten using a light pulse train which has a first pulse portion fp having a power level Pw and a pulse width xT, a multi-pulse portion mp in which a number (n−n') of high level pulses each having a power level of Pw' and a pulse width yT, and, if (n−n')>1, a low level pulse which is located between two of the high level pulses and has a power level Pb and a pulse width (1−y)T are applied, and an end pulse portion ep having a power level Pb' and a pulse width zT, wherein T is a clock time, each of n and n' is independently a positive integer and n is greater than n', wherein each of Pw and Pw' is greater than Pe, Pe is greater than each of Pb and Pb', and at least one of x, y and z is in a range as follows:

$0.35 \leq x \leq 0.75, 0.30 \leq y \leq 0.55, 0.35 \leq z \leq 0.70$, and wherein recording or rewriting is performed by irradiating the recording layer with a laser light beam while the optical information recording medium rotates at a linear speed of from V m/s to 3V m/s, and wherein V is from 3 to 13.

10. The optical information recording medium according to claim 9, wherein the optical information recording medium stores information, and wherein the 1 signal is recorded or rewritten while the at least one of x, y and z is at a fixed value in the range thereof using the information.

11. The optical information recording medium according to claim 9, wherein the at least one of concentric grooves and a spiral groove is wobbled in a radius direction of the optical information recording medium at a period of from 4.0 μm to 4.6 μm.

12. The optical information recording medium according to claim 9, wherein the 0 signal and 1 signal are recorded or rewritten while the power levels Pw, Pw', Pe, Pb and Pb' are controlled such that the recorded or rewritten signals have a jitter σ/T not greater than 9%, a modulation degree not less than 0.55 and a reflectance not less than 16% when the recorded or rewritten signals are reproduced.

* * * * *